J. T. AUGER.
LUBRICATING AND PACKING DEVICE FOR SHAFTS.
APPLICATION FILED DEC. 16, 1919.

1,374,895.

Patented Apr. 19, 1921.

UNITED STATES PATENT OFFICE.

JOSEPH T. AUGER, OF MINNEAPOLIS, MINNESOTA, ASSIGNOR OF THREE-EIGHTHS TO E. M. FERGUSON, OF ST. PAUL, MINNESOTA, AND THREE-EIGHTHS TO E. DU LAC, OF MINNEAPOLIS, MINNESOTA.

LUBRICATING AND PACKING DEVICE FOR SHAFTS.

1,374,895.  Specification of Letters Patent.  Patented Apr. 19, 1921.

Application filed December 16, 1919. Serial No. 345,183.

*To all whom it may concern:*

Be it known that I, JOSEPH T. AUGER, a citizen of the United States, residing at Minneapolis, in the county of Hennepin and State of Minnesota, have invented certain new and useful Improvements in Lubricating and Packing Devices for Shafts, of which the following is a specification.

My invention relates to lubricating and packing devices for shafts, and an object is to provide a device of this character which will efficiently lubricate the shaft by continuously supplying small quantities of lubricant. Another object is to provide a device in which is embodied a packing or stuffing box which will make a tight joint with the shaft, and prevent the escape through the same of water or other fluid.

The full objects and advantages of my invention will appear in connection with the detailed description thereof, and the novel features embodied in my inventive idea will be particularly pointed out in the claims.

In the accompanying drawings which illustrate the application of my invention,—

Figure 1 is a sectional elevational view. Fig. 2 is a cross-sectional view taken on the line 2—2 of Fig. 1. Fig. 3 is a side view of a lubricating ring. Fig. 4 is a fragmentary sectional elevational view of a modification.

Referring to the particular construction shown in the drawings, 10 designates a shaft which extends through a casing or other walled structure 12 which is provided with an annular flange 14 which surrounds the shaft outside of the casing and constitutes a stuffing box for the shaft. A receptacle 16 for lubricant, such as hard oil, has an inner open end extending through the stuffing box adjacent the member 12, and this receptacle may be provided with the customary screw-threaded member 18 for forcing the lubricant down into the receptacle. Adjacent the inner end of the receptacle 16, and loosely surrounding the shaft is a ring 18' having a groove 20 in its circumference and having radial holes 22 leading from the groove to the inner margin of the ring. The ring lies at the inner end of the stuffing box, and upon the ring is placed packing material 24, such as hemp packing. As shown in Fig. 1, the end of the flange 14 is externally threaded to receive internal threads on a flange 26 carried by an annular nut 28 which has an inner flange 30 adapted to fit between the shaft 10 and the flange 14, and which when the nut is turned down compresses the packing 24. The body of the nut 28 and the concentric flanges 26 and 30 are preferably formed as an integral unit. The ring 18 in addition to the radial holes 22 may also be provided with holes 32 crossing the holes 22 at right angles thereto, as shown in Fig. 4. In this figure an annular flange 34 corresponds to the flange 14, previously referred to, but is internally threaded to receive the externally threaded flange 36 of an annular nut 38 surrounding the shaft. The ring 18', as shown in Fig. 4, is placed between rings 40 and 42, and it will be understood that the inner end of a lubricating receptacle 16 lies adjacent the circumferential groove in the ring 18' so as to deliver lubricant thereto in the manner shown in Fig. 1.

The operation and advantages of my invention will be readily understood from the foregoing description. The lubricant passes from the receptacle 16 into the circumferential groove 20 from which it is carried to the inner margin of the ring through the holes 22. The nut 28 which may be conveniently made from a single piece of metal serves to compress the packing 24 and make a tight joint to prevent water or other liquids from escaping past the same. In the form of lubricating ring shown in Fig. 4, the additional holes 32 provide for lubricating the sides of the rings 40 and 42.

I claim:

1. A lubricating and packing device for shafts comprising a box surrounding the shaft and spaced therefrom, a ring at the inner end of said box surrounding said shaft, said ring having a circumferential groove and holes leading therefrom to the inner margin of the ring, means for supplying lubricant to said groove, packing material in contact with the outer side of said ring, and means for holding said packing material under compression.

2. A lubricating and packing device for shafts comprising a box surrounding the shaft and spaced therefrom, a lubricating receptacle having an open end extending into said box, a ring at the inner end of said box surrounding said shaft, said ring having a circumferential groove adapted to receive lubricant from said receptacle and having holes leading from said groove to the inner margin of the ring, packing material in contact with the outer side of said ring, and a nut engageable with the end of said box for holding said packing material under compression.

3. A lubricating and packing device for shafts comprising a box surrounding the shaft and spaced therefrom, a lubricant receptacle having an open end extending into said box, a ring at the inner end of said box surrounding said shaft, said ring having a circumferential groove adapted to receive lubricant from said receptacle and having holes leading from said groove to the inner margin of the ring, packing material in contact with the outer side of said ring, and a nut adapted to be screwed upon the end of said box, said nut having an integral annular flange fitting between the shaft and said box for holding said packing material under compression.

In testimony whereof I hereunto affix my signature.

JOSEPH T. AUGER.